Aug. 17, 1954

J. MONOD 2,686,754

APPARATUS FOR THE CULTIVATION OF MICROORGANISMS

Original Filed Nov. 28, 1950

INVENTOR
JACQUES MONOD
BY
AGENTS

Aug. 17, 1954 J. MONOD 2,686,754
APPARATUS FOR THE CULTIVATION OF MICROORGANISMS
Original Filed Nov. 28, 1950 2 Sheets-Sheet 2

INVENTOR
Jacques Monod
BY
Haseltine, Lake & Co.
AGENTS

Patented Aug. 17, 1954

2,686,754

UNITED STATES PATENT OFFICE 2,686,754

APPARATUS FOR THE CULTIVATION OF MICROORGANISMS

Jacques Monod, Paris, France, assignor to "Le Bactogene," S. A. R. L., Paris, Seine, France, a society of France Original application November 28, 1950, Serial No. 197,867. Divided and this application February 6, 1952, Serial No. 270,125

5 Claims. (Cl. 195—143)

The present invention relates to apparatus for the cultivation of microorganisms (bacteria, yeasts, moulds, protozoa, lower algae, etc.).

Its chief object is to achieve a continuous production of the desired culture with an adjustable output and a high yield while maintaining constancy and homogeneity of the qualities of the product.

Embodiments of my invention will be hereinafter described with reference to the accompanying drawings, given merely by way of example, and in which:

Fig. 1 is a diagrammatic sectional view of an apparatus for the obtainment of microorganism cultures according to my invention;

Figure 2:
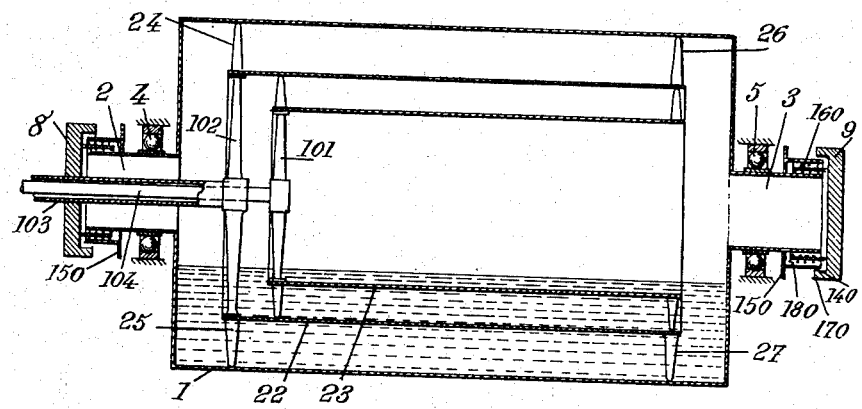
Fig. 2 is a similar view of an apparatus for the same purpose made according to another embodiment.

For the sake of clarity, it will first be reminded that I start from a culture brought to the desired density in a suitable container, in the presence of a suitable gaseous phase, and I continuously add fresh nutrient medium thereto and continuously remove prepared culture therefrom at the same rate, while subjecting the culture in the course of evolution to an action (for instance a stirring one) capable of keeping it homogeneous, that is to say equally rich in cells in all of its parts.

The rate at which fresh medium is added and culture is removed is equal to or lower than a limit which conditions the maintaining of the density or richness in cells of the culture, at a stable level of equilibrium.

Furthermore, the possibilities of interchange between the gaseous phase and the liquid phase are made as close as possible to the conditions of equilibrium between these two phases and in particular to the conditions for maintaining saturation equilibrium between the oxygen of air and the dissolved oxygen.

Concerning the action of the gaseous phase, it will be achieved or intensified, preferably, by creating in the treatment container large interchange areas constituted by liquid films in movement and quickly renewed on suitable metallic or other surfaces.

As a rule, it will be of interest to have the gaseous phase located above the liquid phase without having to pass therethrough in a continuous manner, so as to avoid the formation of foams. Accordingly, the gases will be preferably introduced without being injected into the liquid. An overpressure may eventually be provided, or possibly a partial vacuum.

The gaseous atmosphere may be introduced at the beginning of the operations and remain for the whole duration of the treatment; or it may, on the contrary, be renewed, either in a continuous or in a discontinuous manner.

The treatment container consists of a rotary cylinder or drum, in particular of horizontal or substantially horizontal axis, this arrangement ensuring both the liquid stirring action and the formation of liquid films constituted in this case by the wet surfaces of the container, which are constantly renewed.

At least one of the two above mentioned actions (stirring and film formation) may be completed by suitable means.

For instance, as hereinafter described with reference to Fig. 1, by a spiral rib or piece rotating in the cylinder; and/or (Fig. 2) by one or several cylinders disposed inside the first one; and/or by plates of any suitable shape having relative movements of immersion, then extraction, with respect to the culture liquid; or by static devices including for instance inclined planes on which the liquid is caused to flow.

Finally, means are provided, if necessary, for maintaining a given temperature in the apparatus, which means may consist in heating resistors or include the preliminary heating of the fluids intended to pass through the apparatus, etc.

Fig. 1 shows an apparatus including a cylindrical tank and complying with the above conditions.

It is essentially constituted by a horizontal or substantially horizontal drum, provided at its end with two trunnions 2 and 3 resting in ball bearings 4 and 5. This drum is given a rotary movement through a pulley 6 driven by a motor 7.

The trunnions are closed by discs 8 and 9 fixed to the apparatus frame and removably mounted thereon. Baffle joints ensure bacteriological sterility. The tubes and other parts necessary to the operation of the apparatus enter the cylinder through discs 8 and 9 in which they are fitted with fluidtight joints.

The inner wall of the drum is provided with a spiral-shaped rib 10 the pitch and height of which are determined by the type of operation that is considered. Heating at constant temperature is obtained either by placing the drum in a thermostatic vessel or by disposing electric resistances on the outer surface or even on the inside of the drum (or through any other means), The thermostatic system, whatever it may be, will be adjusted by a regulator 11 dipping in the culture itself.

Inflow of the fresh medium is ensured through a pipe 12 at one of the ends. The flow rate is adjusted, for instance by a pump, for instance a variable delivery pump 50. Removal of an equivalent amount of liquid is ensured by an adjustable siphon 13 connected to the other end of the drum. Instead of a siphon, I might also use an adjustable delivery pump or any other adequate device. The device further includes a gas inflow tube 14 (for air or any other suitable gaseous mixture, sterilized by heating or filtering) and an outlet tube 15. Other tubes, such as a special pipe 16 for inoculation, may be provided.

I may even, if so desired, provide inside the apparatus a source of radiation (infra-red, ultra-violet, X-rays, etc.).

It should be noted that, in the embodiment shown, the level H of the liquid (culture in treatmeant) is higher than the height $h$ of the spiral rib 10. It is also visible that the liquid is caused to circulate constantly in a closed circuit along the path indicated by arrows $f_1 f_2$. The desired stirring action is thus obtained, which ensures homogeneity of the culture in all of its parts, despite the addition of liquid at 12 and the removal of culture at 13.

In the embodiment of Fig. 2, cylinder 1 is provided with coaxial cylinders, having continuous or perforated surfaces, such as 22, 23, of lengths and diameters smaller than those of the drum, to which they may be secured by braces 24, 25, 26, 27. But they might turn independently of said drum, possibly in the opposite directions, being driven through mechanisms (for instance concentric shafts) such as diagrammatically shown in dotted lines (reference characters 101 to 104). In this case, the above mentioned braces, instead of fixing the cylinders with respect to one another would serve only to keep them centered with respect to one another. They may also be provided with helical or other ribs analogous to rib 10 (Fig. 1) to ensure a thorough stirring. Eventually, drum 1 might be stationary and only cylinders 22, 23, rotary, an arrangement which might facilitate the inflow and outflow of the liquids and gases. Anyway, as they are open at both ends (so as to enable air or gases to circulate freely therethrough) and partly immersed, cylinders 22, 23 increase the areas of interchange between the liquid and gaseous phases.

In some cases, and in particular in that of apparatus of great size, it is of interest to provide as high as possible a bacteriological sterility, through suitable means. These means may be constituted, in particular, by baffles provided in the apparatus bearings and provided with sterilizing devices such as ultra-violet ray tubes receiving a shape adapted to the desired purpose. Thus, although these bearings are not perfectly gastight, sterility is maintained since the gases which may enter through the joints are sterilized.

Figure 3:
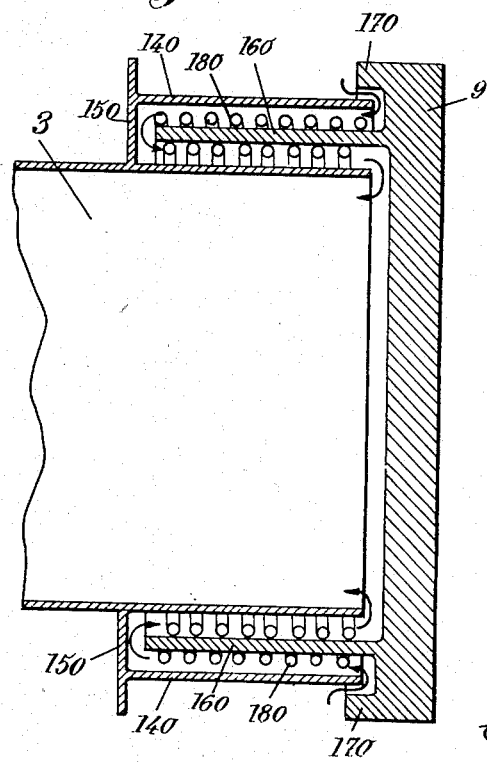
Fig. 3 is a detail view illustrating a feature of my invention.

On Fig. 3, which illustrates one embodiment of such means, the end of trunnion 3 carries a coaxial cylindrical element 140, provided with a hole in its base 150. Between cylinders 3 and 140 there is provided a cylindrical element 160 rigid with closure plate 9, which is provided with a flange 170. On either side of cylinder 160 are provided mercury vapour tubes 180, for instance spiral wound, which are fed with current from an external source by means of terminals, not shown on the drawing, fixed to the closure plate. Any air which may enter along the path indicated by the arrows is therefore necessarily subjected to the ultra-violet radiation and therefore sterilized.

Closure plate 9 is fixed. It is, for instance, rigid with the apparatus frame or bearing 5 on which rest the rotary drums. No mechanical contact exists between the elements of the trunnion and those of the closure plate.

In an apparatus such as those shown by way of example for carrying out the invention, a slight overpressure may be provided in the container, which makes it possible to prevent ozone formed by the ultra-violet rays for instance, to penetrate to the inside. The atmosphere might then become toxic. It suffices, in order to obtain this overpressure, suitably to adjust the flow rates through conduits such as 14 and 15 (Fig. 1).

The operation of such an apparatus, for instance that of Fig. 1, takes place as follows:

Drum 1 is first filled with fresh nutrient medium up to a level corresponding to the volume V which it is desired to maintain permanently in the apparatus, and therefore to the desired output per hour. A sterilization is performed by steam or other suitable means, or by making use of the thermostat heating device.

Once the respective tubes have been connected and the temperature is correct, the medium is inoculated in a sterile manner through tube 16 and the motor is started. The speed of this motor will be chosen so as to obtain an efficient and quick stirring. Stirring is achieved in the plane perpendicular to the axis through rotation itself and in the plane of the generatrices by spiral rib 10. Equilibrium between the gaseous and liquid phases will be further ensured by the large area of interchange constituted by the liquid surface and the wet surfaces of the drum and spiral rib. Growth of the culture is then studied by collecting samples at time intervals until the desired density is obtained.

From this time on, production goes on in a continuous manner by feeding fresh liquid at 12 according to the desired output rate. In the embodiment shown by the drawing, siphon 13 supplies an output of culture at the rate of the feed of fresh medium.

If ratio D is lower than the above mentioned limit or nearly equal to this limit, the apparatus supplies a culture which is perfectly homogeneous and the density of which remains constant both with relation to space and to time. This apparatus therefore works at the most favorable density and the yield is optimum.

The production can be stopped instantaneously by stopping the delivery and again started very quickly without requiring a new sterilizing or inoculating as long as sufficient portion of the cells is still living.

Furthermore, inside limits determined by the capacity of the apparatus and the properties of the microorganism that is used, the rate of production per hour may be modified at any time and given the desired value by modifying volume V, that is to say the level of the liquid in the apparatus and modifying the output rate accordingly, the ratio D remaining the same or still complying with the same condition. I might also modify the output rate without modifying volume V.

In a general manner, the rate of growth will automatically become adjusted in accordance with the output rate $$\mu = \frac{D}{0.69}$$

whereby my method makes it possible to adjust the rate of growth of the culture and to give it any value lower than or nearly equal to the maximum rate of growth of the micro-organism that is considered in the medium used, i. e. to fix and determine one of the essential characteristics of growth, upon which most of the qualities and properties of the product depend. My method therefore truly makes it possible to obtain adjustment at will of the rate of growth.

Of course, while operating in a continuous manner, I might modify at will, for given periods of time, the rates of output.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An apparatus for the obtainment of a micro-organism culture in liquid form which comprises, in combination, a cylindrical drum of substantially horizontal axis to contain the liquid culture in treatment, at least one other drum open at both ends mounted in said first mentioned drum coaxially therewith, the first mentioned drum having end walls extending continuously, in the vertical plane of said axis, from the lowest generatrix of said first mentioned drum to a level higher than the level of the lowest generatrix of the second mentioned drum, whereby liquid may be kept in the first mentioned drum at a level such that the second mentioned drum constantly dips in this liquid, means for rotating at least one of said drums, means for continuously feeding fresh nutrient medium into said first mentioned drum at one end thereof, and means for continuously removing culture from said first mentioned drum at the other end thereof.

2. An apparatus for the obtainment of a micro-organism culture in liquid form which comprises, in combination, a cylindrical drum of substantially horizontal axis to contain the liquid culture in treatment, at least one other drum open at both ends mounted in said first mentioned drum coaxially therewith, the first mentioned drum having end walls extending continuously, in the vertical plane of said axis, from the lowest generatrix of said first mentioned drum to a level higher than the level of the lowest generatrix of the second mentioned drum, whereby liquid may be kept in the first mentioned drum at a level such that the second mentioned drum constantly dips in this liquid, means for rotating at least one of said drums, means for continuously feeding fresh nutrient medium into said first mentioned drum at one end thereof, means for continuously removing culture from said first mentioned drum at the other end thereof, and a helical rib carried by said rotating drum for stirring said liquid culture.

3. An apparatus for the obtainment of a micro-organism culture in liquid form which comprises, in combination, a cylindrical drum of substantially horizontal axis to contain the liquid structure in treatment, at least one other drum, open at both ends, mounted in said first mentioned drum coaxially therewith, the first mentioned drum having end walls constituted by annular inward flanges of an inner diameter smaller than the diameter of the second mentioned drum, whereby liquid may be kept in the first mentioned drum at a level such that the second mentioned drum constantly dips in said liquid, cylindrical hollow trunnions rigid with said first mentioned drum extending outwardly from the inner edges of the end walls of said first mentioned drum, bearings for supporting said trunnions, fixed plates located opposite the outer ends of said trunnions, cooperating baffle means carried by said plates and said trunnions to restrict communication between the inside of said first mentioned drum and the external atmosphere, conduit means extending through one of said fixed plates for continuously adding fresh nutrient medium into said first mentioned drum, conduit means extending through the other of said plates for continuously removing culture from said first mentioned drum, a helical rib carried by the inner wall of said first mentioned drum for stirring said liquid culture therein, and means for rotating said first mentioned drum about its axis.

4. An apparatus according to claim 3 further including a mercury vapour tube wound helically in the space between said baffle means for sterilizing gas circulating through said space.

5. An apparatus for the obtainment of a micro-organism culture in liquid form which comprises, in combination, a cylindrical drum of substantially horizontal axis to contain the liquid structure in treatment, at least one other drum, open at both ends, mounted in said first mentioned drum coaxially therewith, the first mentioned drum having end walls constituted by annular inward flanges of an inner diameter smaller than the diameter of the second mentioned drum, whereby liquid may be kept in the first mentioned drum at a level such that the second mentioned drum constantly dips in said liquid, cylindrical hollow trunnions rigid with said first mentioned drum extending outwardly from the inner edges of the end walls of said first mentioned drum, bearings for supporting said trunnions, fixed plates located opposite the outer ends of said trunnions, cooperating baffle means carried by said plates and said trunnions to restrict communication between the inside of said first mentioned drum and the external atmosphere, conduit means extending through one of said fixed plates for continuously adding fresh nutrient medium into said first mentioned drum, conduit means extending through the other of said plates for continuously removing culture from said first mentioned drum, conduit means extending through one of said fixed plates for feeding gas under pressure into said first mentioned drum, to maintain therein a pressure slightly above the pressure in the external atmosphere, a helical rib carried by the inner wall of said first mentioned drum for stirring said liquid culture therein, and means for rotating said first mentioned drum about its axis.

References Cited in the file of this patent
UNITED STATES PATENTS

| Number | Name | Date |
|---|---|---|
| 888,685 | Arnold | May 26, 1908 |
| 1,271,433 | Cassel | July 2, 1918 |
| 2,137,051 | Jain | Nov. 15, 1938 |
| 2,189,279 | Bitner | Feb. 6, 1940 |
| 2,248,526 | François | July 8, 1941 |